United States Patent [19]

Nuesslein

[11] 4,282,982

[45] Aug. 11, 1981

[54] TUBE CLOSURE DEVICE

[76] Inventor: Alfred Nuesslein, Kruppstrasse 31, 447 Meppen, Fed. Rep. of Germany

[21] Appl. No.: 129,451

[22] Filed: Mar. 11, 1980

[51] Int. Cl.³ .............................................. B65D 53/00
[52] U.S. Cl. .................................. 220/237; 220/236; 220/234; 138/89
[58] Field of Search .............. 220/235, 236, 237, 234; 138/89

[56] References Cited

U.S. PATENT DOCUMENTS

| 2,974,685 | 3/1961 | Nooy | 220/236 X |
| 3,613,936 | 10/1971 | Kaiser | 220/237 |

Primary Examiner—George T. Hall
Attorney, Agent, or Firm—Nathan Edelberg; Robert P. Gibson; James T. Deaton

[57] ABSTRACT

A closure device which seals against the internal circumferential surface of a tube by an O-ring seal between a plug member and the circumferential surface and the plug being held in the tube by a plurality of segmented members that are positioned around the plug and pressed against the O-ring seal and the internal circumference of the tube by means on the plug that forces the segments into contact with the O-ring seal and the internal circumference of the tube.

5 Claims, 7 Drawing Figures

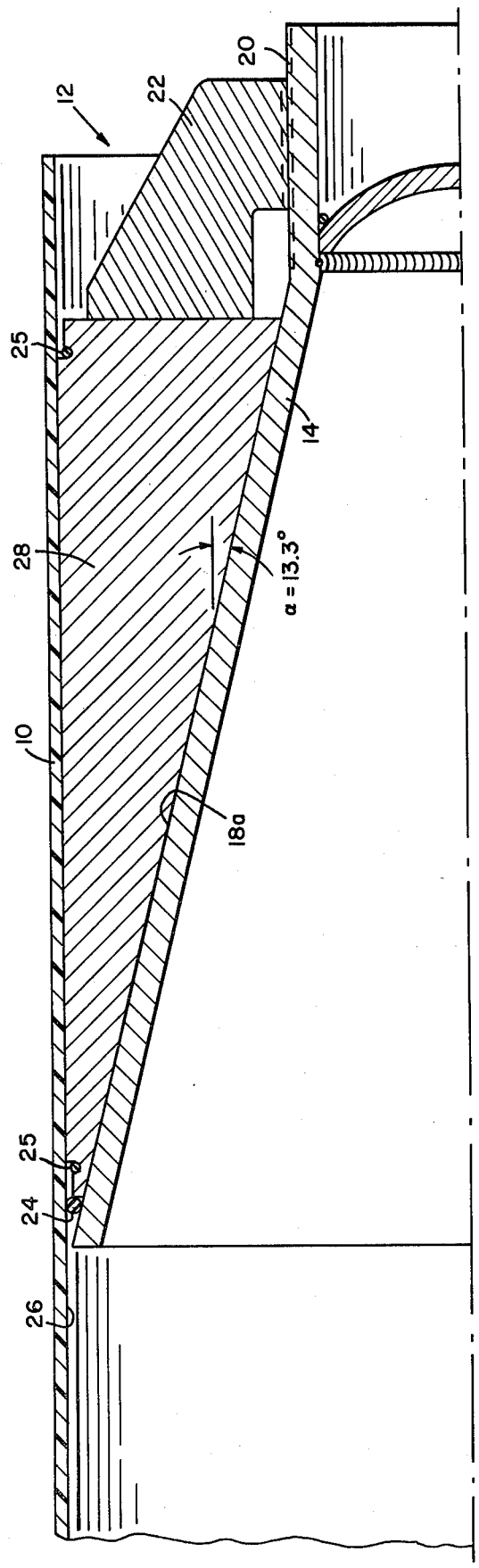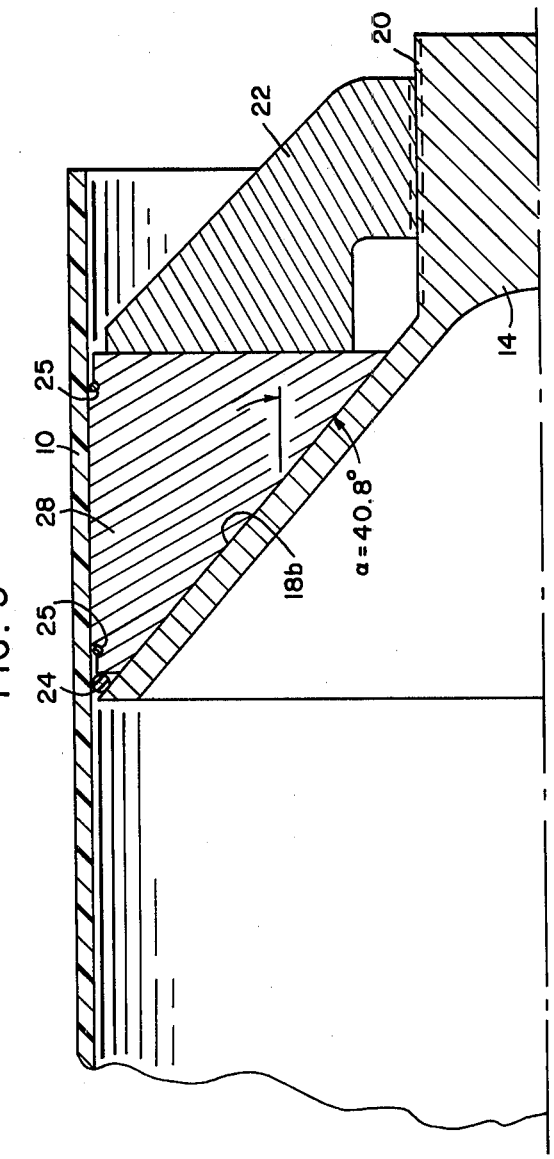

TUBE CLOSURE DEVICE

DEDICATORY CLAUSE

The invention described herein may be manufactured, used, and licensed by or for the Government for governmental purposes without the payment to me of any royalties thereon.

BACKGROUND OF THE INVENTION

In the rocket environment, there is a need for a closure and seal for a tube which is under internal pressure. This seal is needed of such a structure that the internal diameter of various tubes can vary plus or minus a predetermined amount and still have said closure device seal against the internal circumference thereof.

In view of this need, it is an object of this invention to provide a closure device that seals against the internal circumference of a tube.

Another object of this invention is to provide a closure device that can seal against slightly varying internal circumferential surfaces of a tube by adjusting to the actual internal diameter of the tube.

Still another object of this invention is to provide a closure device which provides its own frictional means for holding the closure device in the tube.

Yet another object of this invention is to provide a closure in which means are provided for compensating for temperature stresses.

A still further object of this invention is to provide a closure device which withstands forces that occur from internal tube pressure.

A still further object of this invention is to provide a tube closure which can be used on tubes which have no internal pressures.

Other objects and advantages of this invention will be obvious to those skilled in this art.

SUMMARY OF THE INVENTION

In accordance with this invention, a tube closure device is provided for sealing the interior circumferential surface of a tube by utilizing a member that has a frusta-conical shaped outer surface with a seal for sealing against a portion of the outer surface and the interior surface of the tube and a plurality of wedge members with means for adjusting the wedge members against the frustaconical surface and therefore into frictional contact with the interior circumferential surface of the tube to cause the seal to seal against the circumferential inner surface of the tube and the frusta-conical surface position of the member. This connection provides a seal as well as a frictional connection to hold the closure inside the tube.

BRIEF DESCRIPTION OF THE DRAWINGS

FIG. 5 is a sectional view partially cutaway of a closure device illustrated in another embodiment according to this invention, FIG. 6 is a sectional view partially cutaway of another embodiment in accordance with this invention.

DESCRIPTION OF THE PREFERRED EMBODIMENTS

Figure 2:
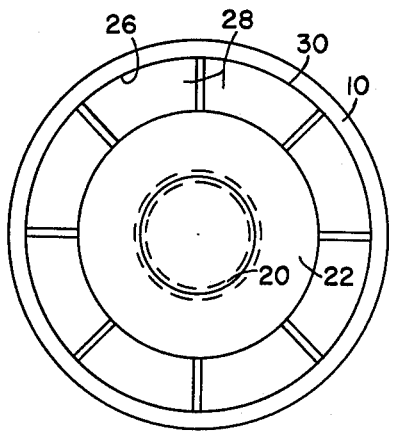
FIG. 2 is an end view of the tube closure device in a tube in accordance with this invention.
Figure 1:
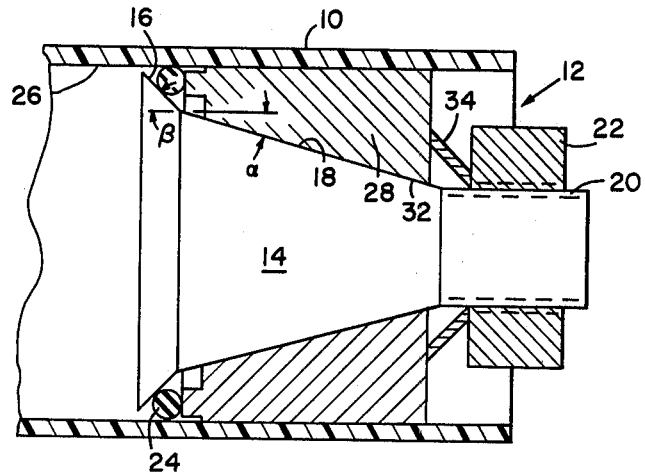
FIG. 1 is a sectional view of a tube with a tube closure device in accordance with this invention.
Figure 3:
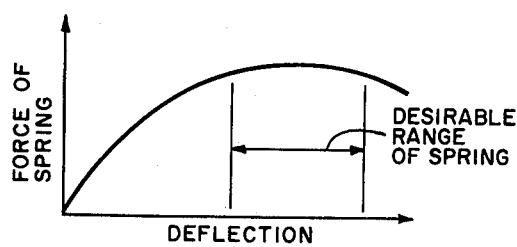
FIG. 3 is a force deflection diagram of the spring characteristics of a variable spring washer used in this invention.

Referring now to the drawing, FIG. 1 illustrates a closure device including tube 10 with closure 12 mounted therein. Closure 12 includes an inner tapered member 14 that has a first frusta-conical surface 16 and a second tapered surface 18 that can either be frusta-conical or of a polygonal shape in cross section. Member 14 also includes a threaded section 20 that has a nut 22 threaded thereon. A resilient O-ring 24 is adapted for sealing between surface 16 and inner circumferential surface 26 of tube 10. A plurality of segments 28 (See FIG. 2) have curved outer surfaces 30 for making frictional contact with inner circumferential surface 26 of tube 10 and inner surfaces 32 for corresponding with the particular surface of which surface 18 is. Also, a belleville spring washer 34 is mounted between segments 28 and nut 22 to exert predetermined forces onto segments 28 and maintain a frictional contact between the outer surfaces 30 of segments 28 and inner circumferential surface 26 of tube 10. This frictional contact is sufficient to overcome the pressure exerted from within tube 10 which acts to push closure device 12 from tube 10. When in the clamping or frictional position, O-ring 24 seals between surface 16 and inner circumferential surface 26. Belleville spring 34, if used, is designed to have a force deflection as illustrated in FIG. 3 in order to compensate for temperature changes if the closure is being used in a variable temperature environment.

Figure 4:
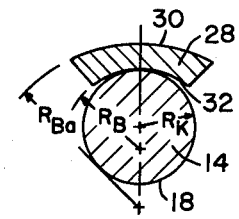
FIG. 4 is a sectional view illustrating the relationship of the tapered surface of the conical member relative to the segments therearound.

Referring now to FIG. 4, in order to get very small bending-stresses, the dimensions of surface 18 of member 14 relative to members 28 at tube 10 should be as follows, $R_k < R_b$ and $R_{ba} \leq$ minimum tube-radius. Also, due to the frictional forces between surfaces 18 and 32, a thin layer of Teflon or tetrafluoroethylene can be used on surface 18 to reduce the frictional contact and provide an appropriate friction factor between surfaces 18 and 32. This frictional contact should be kept relatively low and a Teflon layer or other bearing can be used to accomplish this.

In operation, closure 12 in its assembled arrangement is placed into tube 10 and nut 22 is tightened. As nut 22 is tightened, tapered surface 18 of member 14 moves toward nut 22, segments 28 move radially outward and make contact with internal circumferential surface 26 of tube 10 to secure the closure inside tube 10. Obviously, nut 22 will have to be tightened to a predetermined torque in order for the frictional contact between segments 28 and internal surface 26 to be sufficient to overcome appreciable forces applied by pressure inside tube 10. If tube 10 and closure 12 are subjected to temperature changes, belleville spring 34 is designed to compensate for these temperature changes to adjust for stress changes on the connection. The belleville spring is designed in such a manner that the force of the spring is clearly independent of deflection over a predetermined range as illustrated in FIG. 3.

Referring now to FIG. 5, another embodiment of the invention is illustrated and like numerals are used for corresponding parts of this embodiment to those of FIGS. 1–4. In this embodiment, member 14 is hollow and has only one frusta-conical surface 18a against which segments 28 act and are forced radially outwardly when nut 22 is tightened relative to threaded section 20. Also, in this embodiment O-ring 24 seals between an end portion of frusta-conical surface 18a and internal circumferential surface 26. To aid in assembly of the closure device, spring clips 25 are located at each end of segments 28 to hold the segments in a circular pattern. Also, in this embodiment the angle of frusta-conical surface 18a is at an angle of about 13.3 degrees. This closure device is assembled with tube 10 in substantially the same manner as that for FIG. 1 above. Also, if needed, surface 18a can have a coating of Taflon thereon to reduce friction.

Referring now to FIG. 6, this embodiment likewise uses corresponding reference numerals for corresponding parts. In this embodiment, member 14 also has only one frusta-conical surface 18b for cooperation with a corresponding surface on each of segments 28. In this embodiment the angle of frusta-conical surface 18a is 40.8 degrees. As can be seen from the illustration in FIGS. 1, 5, and 6 this angle referred to in the drawings as α can vary over a great range depending upon the particular application the closure device is to be put to. Also, the frictional engagement between tube 10 and the outer surface of segments 28 can have a bearing material such as Teflon on the particular angle α of the frusta-conical surface. That is, the greater the resistance to actual movement out of tube 10 due to the frictional or adhesive contact between inner surface 26 of member 10 and the outer surface of segments 28, the greater angle α can be.

Figure 7:
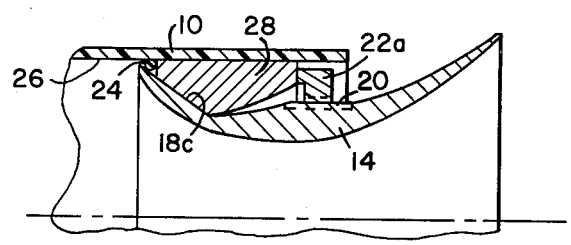
FIG. 7 is a further embodiment in accordance with this invention in which the closure device is used relative to a nozzle.

Referring now to FIG. 7, like numerals are again used to designate corresponding parts. In this embodiment, central core member 14 is illustrated as a streamlined nozzle with segments 28 cooperating with a single frusta-conical surface 18c. Also, in this embodiment nut 22a is cut into two parts and reassembled with brackets and screws (not shown) in order to install the connection. That is, in this device in order to utilize member 14 as a streamlined nozzle, member 22a is cut in two parts and then secured back together to act as a nut to clamp members 28 relative to member 14 and tube 10. Seal 24 seals between surface 18c and surface 26 in the same manner as in the other embodiments.

I claim:

1. A tube closure device comprising a closure assembly including a central member with an outer frusta-conical means, a plurality of arcuate segments positioned around a portion of said frusta-conical means, an O-ring seal in contact with a portion of said frusta-conical means and an end of each of said arcuate segments being in contact with said O-ring seal, adjustable means on said central member for applying force to said arcuate segments to cause said segments to be moved axially and radially on said frusta-conical means and cause said O-ring to move axially and radially and a belleville spring mounted on said central member between said adjustable means and said arcuate segments, and said adjustable means including a threaded portion on said central member and a nut threaded on said threaded portion.

2. A tube closure device as set forth in claim 1, wherein said central member has a passage therethrough.

3. A tube closure device as set forth in claim 1, wherein said closure assembly is mounted in a tube device that has an internal circumferential surface and said O-ring seals against said internal circumferential surface and said arcuate segments make contact with said internal circumferential surface to hold said closure assembly in said tube device.

4. A tube closure device as set forth in claim 3, wherein said arcuate segments have snap ring means there about to hold the arcuate segments in a generally circular arrangement.

5. A tube closure device as set forth in claim 3, wherein said central member has a streamlined nozzle type passage therethrough.

* * * * *